J. E. FINLEY.
Bee Hive.
No. 59,377.
Patented Nov. 6, 1866.
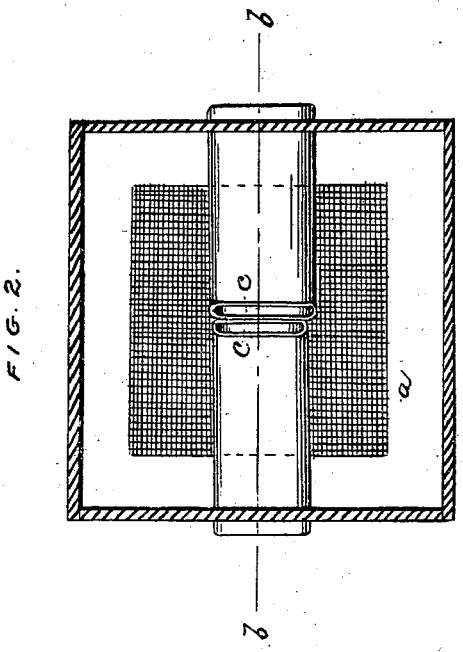
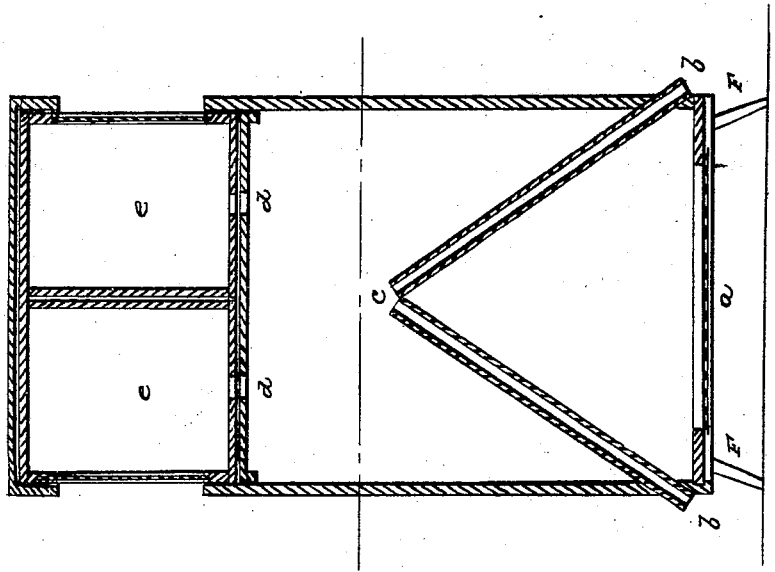
WITNESSES:
INVENTOR.

UNITED STATES PATENT OFFICE.

JOHN E. FINLEY, OF MEMPHIS, TENNESSEE.

IMPROVEMENT IN BEE-HIVES.

Specification forming part of Letters Patent No. 59,377, dated November 6, 1866.

*To all whom it may concern:*

Be it known that I, JOHN E. FINLEY, of Memphis, county of Shelby, and State of Tennessee, have invented a new and useful Improvement in Bee-Hives; and I do hereby declare that the following is a full, clear, and exact description of the construction and operation of the same, reference being had to the annexed drawings, making a part of this specification, in which—

Figure 1 is a perspective view; Fig. 2, a sectional view.

A is a ventilator; B C, tubes; E E, honey-boxes; D D, entrance; F F, uprights.

My invention consists in providing bee-hives with tubes B C and a ventilator, A, constructed in such a manner as to exclude moths, worms, or other insects from the hive, while the bee can go in and out of the hive without hinderance.

I construct my hive in any of the usual forms, to which I attach a ventilator, A, made of perforated tin or other metal, constructed in such a manner as to admit the air freely, and at the same time prevent worms or insects from entering the hive. I also attach two or more tubes, B C, constructed in such a manner that while B is at the lower part of the hive, C will be in the center of the hive. The object of these tubes is to form a passage for the entrance of the bees, and at the same time compel the moths or other insects in order to enter the hive to have to penetrate the heart of the family of bees.

To further prevent worms or other insects from entering the hive, I have elevated my hive upon uprights F F, thus preventing the deposit of the moth from entering the hive, while the tubes B C prevent his making the deposit in the hive.

I construct the top of my hive in four separate apartments, thus making honey-taking easy, as represented in E E.

I claim—

The combination of the tubes B C with the ventilator A, for the purposes herein set forth.

JOHN E. FINLEY.

Witnesses:
A. MARTIN,
PERRY FINLEY.